United States Patent Office 2,860,154
Patented Nov. 11, 1958

2,860,154

FLUORINATED ORGANIC ISOCYANATES AND THEIR PREPARATION

James Charles Kauer, Wilmington, Del., assignor to E. I. du Pont de Nemours and Company, Wilmington, Del., a corporation of Delaware No Drawing. Application September 28, 1956
Serial No. 612,872

10 Claims. (Cl. 260—453)

This invention relates to new organic compositions containing fluorine and to a process for preparing these compositions. More particularly, it relates to organic fluorine compounds containing isocyanate groups and to their preparation.

Compounds containing fluorine have achieved considerable technical importance because of their unusual properties. Some of these compounds, especially those with a plurality of fluorine atoms attached to carbon, show a high degree of chemical stability and are useful when resistance to thermal breakdown and to oxidation are needed. Others are highly reactive and are valuable as fluorinating agents or as agents for introducing fluorine-containing groups in the manufacture of useful products. Fluorocarbons which contain isocyanate groups represent a class of reactive compounds useful in the manufacture of a wide variety of other fluorine-containing compounds.

The preparation and properties of fluorine-containing isocyanates have received only limited attention. In one process they are prepared by thermal decomposition of perfluoroacyl azides. The process is hazardous, particularly in the preparation of isocyanates with short fluorocarbon chains. In another process phosgene is reacted with a dihydroperfluoroalkylamine. The process is limited to the preparation of fluorocarbon isocyanates in which the isocyanate is attached to an intermediate methylene group. No fluoroalkyl isocyanates possessing substituents other than fluorine in place of hydrogen on the alkyl chain have heretofore been prepared.

An object of this invention is, therefore, provision of a new and useful process for synthesizing fluorine-containing isocyanates.

A further object is provision of novel fluorine-containing isocyanates having alkoxy, cycloalkoxy or aryloxy substituents.

The above-mentioned and still further objects are achieved in accordance with this invention by a process yielding a novel class of isocyanates characterized by the general formula, R—O—CF$_2$—NCO, in which R is a hydrocarbon or halohydrocarbon of not more than 8 carbon atoms. The halogen may be fluorine, chlorine or bromine. In the preferred form of the invention R is a saturated alkyl group of not more than 4 carbon atoms. However, R may include cycloalkyl and aryl radicals such as the cyclohexyl, phenyl or tolyl and halogenated aryl radicals such as the chlorophenyl.

These compounds are obtained by thermally decomposing at a temperature of at least 500° C. cyclic compounds which are esters of 3,3,4,4-tetrafluoro-1,2-diazetidine-1,2-dicarboxylic acids. The esters have the following general formula, in which R has the definition given above:

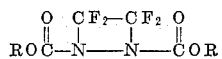

A method of synthesizing these cyclic esters is described in U. S. P. 2,456,176, issued December 14, 1944, to R. D. Cramer.

The mechanism of the thermal decomposition is not entirely clear. An unusual and unexpected rearrangement of an alkoxy group is apparently involved as suggested by the following equation:

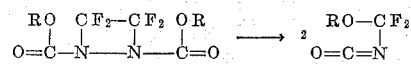

The pyrolysis is generally carried out by passage of the reactant under anhydrous conditions through equipment constructed of inert and chemically unreactive material. The pyrolysis chamber is packed with unreactive material to provide maximum exposure of surface to the diazetidine.

The temperature for the decomposition will vary to some extent with the starting compound but will generally not be lower than 500° C. or higher than 700° C. The preferred range lies between about 550° and 650° C.

While the pressure used for the pyrolysis may also be varied, a reduced pressure of about 0.1–10 mm. of mercury is preferred. Higher pressures up even to atmospheric can also be used but generally result in lower yield of the desired product due to side reactions. The reactions should preferably be carried out in the presence of an inert gas such as nitrogen, argon, etc., when higher pressures are used.

Space velocity of the reactant through the reactor is of no critical importance in the invention. Yields can be improved by the recycle of undecomposed material at temperatures about 10° C. higher than the initial pyrolysis temperatures.

Examples of substituted difluoromethyl isocyanates which can be prepared by the above-described process are as follows: n-propoxydifluoromethyl isocyanate from dipropyl 3,3,4,4 - tetrafluoro-1,2-diazetidine-1,2-dicarboxylate; sec-butoxydifluoromethyl isocyanate from di-sec-butyl 3,3,4,4-tetrafluoro-1,2-diazetidine-1,2-dicarboxylate; n-octyloxydifluoromethyl isocyanate from di-n-octyl 3,3,-4,4-tetrafluoro-1,2-diazetidine-1,2-dicarboxylate; cyclohexyloxydifluoromethyl isocyanate from dicyclohexyl 3,3,4,4-tetrafluoro-1,2-diazetidine-1,2-dicarboxylate; phenoxydifluoromethyl isocyanate from diphenyl 3,3,4,4-tetrafluoro-1,2-diazetidine-1,2-dicarboxylate and p-chlorophenoxydifluoromethyl isocyanate from di-p-chlorophenyl 3,3,4,4-tetrafluoro-1,2-diazetidine-1,2-dicarboxylate.

Compounds in which the hydrocarbon group attached to the ether oxygen is an alkyl radical of no more than 4 carbon atoms are the most readily prepared by the present method since they undergo less decomposition during preparation than compounds of higher carbon content.

In one preferred embodiment of the invention, anhydrous dimethyl 3,3,4,4-tetrafluoro-1,2-diazetidine-1,2-dicarboxylate is continuously decomposed to methoxydifluoromethyl isocyanate by passage through a reaction zone held at 550–650° C. and 0.1–10 mm. of mercury pressure. Unreacted materials are removed from the product and recycled through the reaction zone.

The preparation and properties of typical compounds of this invention are given in the following examples which are intended to be illustrative only and not limiting. In these examples, quantities of reactants are given as parts by weight and subatmospheric pressures are recorded in mm. of mercury.

*Example I*

A stainless steel cylinder (capacity 80 parts of water) was charged with 25 parts of the dimethyl ester of azodiformic acid. Tetrafluoroethylene was injected into the cylinder over a period of 12 hours at a pressure of 300 to 400 p. s. i. and at a temperature of 150° C. The product, 35.7 parts of a viscous yellow liquid, was flash distilled and the distillate dissolved in 70 parts of diethyl ether and 8 parts of ethanol. A solution of 2 parts of sodium bisulfite in 20 parts of water was added and the mixture was stirred until it become colorless. The organic layer, after separation, drying and distillation, gave 21.3 parts of dimethyl 3,3,4,4-tetrafluoro-1,2-diazetidine-1,2-dicarboxylate, boiling at 98.0–98.2° C. at 32 mm. pressure; $n_D^{24}$, 1.3809.

This compound was pyrolyzed in a 25 x 300 mm. quartz tube packed with 5 mm. lengths of 7 mm. quartz tubing connected to two traps in series cooled by liquid nitrogen and in turn connected to a vacuum pump. The pyrolysis tube was maintained under 2 mm. pressure in a furnace at 600° C. Eighty parts of dimethyl 3,3,4,4-tetrafluoro-1,2-diazetidine-1,2-dicarboxylate were passed through the tube at a rate of about 0.8 part per minute. Volatile products and unreacted starting material were condensed in the first trap. The contents of this trap were warmed to room temperature and the volatile portion collected in the second trap. The non-volatile residue was again passed dropwise through the pyrolysis tube. This recycling operation was repeated three times, during which period 60 parts of methoxydifluoromethyl isocyanate were collected in the second trap. The product was a colorless liquid which boiled at 43–44° C., had a sharp, biting odor and acted as a lachrymator. Analysis of the product for fluorine gave the following results:

Calc'd. for $C_3H_3F_2NO_2$: F, 30.9%. Found: F, 30.9%.

*Example II*

In another experiment dimethyl 3,3,4,4-tetrafluoro-1,2-diazetidine-1,2-dicarboxylate was pyrolyzed at an initial temperature of 550–580° C. and 2 mm. pressure. Twenty-one parts of the ester were reacted at this temperature and the nonvolatile products from the first trap were recycled twice at a temperature of 610 to 620° C. There were obtained 16 parts of methoxydifluoromethyl isocyanate yielding the following analytical data.

Calc'd. for $C_3H_3F_2NO_2$: C, 29.3%; H, 2.68%; N, 11.4%; mol. wt., 123.1. Found: C, 29.6%; H, 2.43%; N, 11.9%; mol. wt., 117.0.

The structure of the product was established by infrared absorption and nuclear magnetic resonance spectra and confirmed by the data on elemental analysis given in Examples I and II.

*Example III*

The diethyl ester of 3,3,4,4-tetrafluoro-1,2-diazetidine-1,2-dicarboxylic acid was prepared by a process similar to that given in Example I. Twenty parts of the ester were passed dropwise through the pyrolysis tube at a temperature of 550° C. and pressure of 2 mm. There were obtained 10 parts of a colorless liquid which boiled at room temperature and was identified by its infrared spectrum as ethoxydifluoromethyl isocyanate.

*Example IV*

The compounds of this invention are highly reactive chemicals and are useful in removing unstable components from gasoline. This example illustrates the use of a typical compound for purifying gasoline.

Into a flask, flushed with dry nitrogen, was poured 9.72 parts of a commercial lead-free gasoline containing 24% olefins, 16% aromatics, 56% paraffins, 4% cycloparaffins and 0.05% sulfur. There was then added 0.54 part of methoxydifluoromethyl isocyanate. When shaken, the mixture became yellow and slightly cloudy. On standing for 2 hours, it formed a flocculent precipitate. After 3 hours' standing at room temperature, the mixture was heated 1 minute on a steam bath. Eleven parts of water was added thereto. The resultant aqueous mixture was allowed to stand overnight at room temperature. The gasoline layer was separated, washed with water and dried over anhydrous sodium sulfate. The treated gasoline, on titration with bromine, took up 0.096 g. of bromine/ml. An untreated sample, employed as a control, reacted with 0.23 g. of bromine/ml. The decrease in bromine uptake shows that unstable components in the gasoline were removed by the treatment.

The compounds of this invention are also useful in the preparation of other valuable compounds by reaction with such chemicals as phenol, diphenylamine and dichloroaniline.

The embodiments of the invention in which an exclusive property or privilege is claimed are defined as follows:

1. A compound having the formula:

where R is an organic radical of the group consisting of hydrocarbon and monohalohydrocarbon radicals having not more than 8 carbon atoms and in which the halogen is a member of the group consisting of fluorine, chlorine and bromine.

2. The compound of claim 1 in which R is an alkyl radical having no more than 4 carbon atoms.

3. Methoxydifluoromethyl isocyanate.

4. Ethoxydifluoromethyl isocyanate.

5. The method of forming the compound of claim 1 which comprises thermally decomposing a diester of the formula

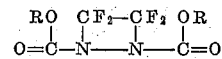

at a temperature of about 500–700° C., R being as defined in claim 1.

6. The method of claim 5 in which the temperature is about 550–650°C.

7. The method of claim 5 in which the pressure during the pyrolysis is about 0.1–10 mm. of mercury.

8. The method of claim 5 carried out as a continuous process in a reaction zone to which nondecomposed ester in the product is recycled.

9. The method of forming methoxydifluoromethyl isocyanate which comprises thermally decomposing dimethyl 3,3,4,4-tetrafluoro-1,2-diazetidine-1,2-dicarboxylate at a temperature of about 500–700° C.

10. The method of forming ethoxydifluoromethyl isocyanate which comprises thermally decomposing diethyl 3,3,4,4-tetrafluoro-1,2-diazetidine-1,2-dicarboxylate at a temperature of about 500–700° C.

References Cited in the file of this patent
UNITED STATES PATENTS
2,617,817   Ahlbrecht et al. _____ Nov. 11, 1952